(12) United States Patent
Kang et al.

(10) Patent No.: US 9,734,346 B2
(45) Date of Patent: Aug. 15, 2017

(54) DEVICE AND METHOD FOR PROVIDING SECURITY IN REMOTE DIGITAL FORENSIC ENVIRONMENT

(71) Applicant: ELECTRONICS AND TELECOMMUNICATIONS RESEARCH INSTITUTE, Daejeon (KR)

(72) Inventors: SeongKu Kang, Daejeon (KR); Mincheol Jeon, Daejeon (KR); Youngjun Cho, Daejeon (KR); Jaeduck Choi, Daejeon (KR); Sinkyu Kim, Daejeon (KR); Jungtaek Seo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/889,988

(22) PCT Filed: Nov. 27, 2013

(86) PCT No.: PCT/KR2013/010837
§ 371 (c)(1),
(2) Date: Nov. 9, 2015

(87) PCT Pub. No.: WO2014/093058
PCT Pub. Date: Dec. 4, 2014

(65) Prior Publication Data
US 2016/0078240 A1   Mar. 17, 2016

(30) Foreign Application Priority Data

May 30, 2013   (KR) ........................ 10-2013-0061425

(51) Int. Cl.
*G06F 21/62* (2013.01)
*G06F 21/44* (2013.01)
(Continued)

(52) U.S. Cl.
CPC ........ *G06F 21/6209* (2013.01); *G06F 21/445* (2013.01); *G06F 21/552* (2013.01);
(Continued)

(58) Field of Classification Search
CPC .. G06F 21/6209; G06F 21/552; G06F 21/577; G06F 21/445; G06F 21/64; G06F 21/78
See application file for complete search history.

(56) References Cited

U.S. PATENT DOCUMENTS

| 2004/0022523 A1* | 2/2004 | Duerr ................... G11B 19/122 386/231 |
| 2009/0150998 A1 | 6/2009 | Adelstein et al. |

(Continued)

FOREIGN PATENT DOCUMENTS

| KR | 10-2009-0064699 A | 6/2009 |
| KR | 10-0987064 B1 | 10/2010 |

(Continued)

OTHER PUBLICATIONS

Search Report for International Application No. PCT/KR2013/010837.

*Primary Examiner* — Mohammad A Siddiqi
(74) *Attorney, Agent, or Firm* — LRK Patent Law Firm

(57) ABSTRACT

An apparatus and method for collecting digital evidence from a target system to be analyzed at a remote location and then providing security in a remote digital forensic environment based on the collected digital evidence. The method of providing security includes making, by a security providing apparatus, an evidence collection request for collection of evidence of an evidence collection-target apparatus from an (Continued)

evidence collection agent in a remote digital forensic environment, collecting evidence data corresponding to the evidence collection request from the evidence collection agent, verifying the evidence data based on a signature value of the evidence data collected from the evidence collection agent, generating evidence analysis data based on the verified evidence data, verifying the evidence analysis data based on a signature value of the evidence analysis data, and providing security for the evidence collection-target apparatus based on results of the verification of the evidence analysis data.

4 Claims, 7 Drawing Sheets

(51) Int. Cl.
  *G06F 21/55* (2013.01)
  *G06F 21/57* (2013.01)
  *G06F 21/64* (2013.01)
  *G06F 21/78* (2013.01)
(52) U.S. Cl.
  CPC ............ *G06F 21/577* (2013.01); *G06F 21/64* (2013.01); *G06F 21/78* (2013.01)

(56) References Cited

U.S. PATENT DOCUMENTS

| | | | |
|---|---|---|---|
| 2010/0299740 A1* | 11/2010 | Sheldon | H04L 63/101 726/12 |
| 2011/0047130 A1* | 2/2011 | Kim | G06Q 10/10 707/692 |
| 2011/0055590 A1 | 3/2011 | Lee et al. | |
| 2011/0072274 A1* | 3/2011 | Leoutsarakos | H04L 63/0823 713/182 |
| 2011/0153748 A1* | 6/2011 | Lee | H04L 67/125 709/205 |
| 2011/0206350 A1* | 8/2011 | Cheng | G06T 1/0021 386/260 |
| 2012/0011153 A1* | 1/2012 | Buchanan | G06F 21/552 707/771 |
| 2012/0109969 A1 | 5/2012 | Gil et al. | |

FOREIGN PATENT DOCUMENTS

| | | |
|---|---|---|
| KR | 10-2011-0022140 A | 3/2011 |
| KR | 10-2011-0070767 A | 6/2011 |
| KR | 10-2012-0044002 A | 5/2012 |
| WO | 2008/156328 A2 | 12/2008 |

* cited by examiner

```
                        TOKEN

- SERIAL NUMBER
- ISSUER ID INFORMATION
- TARGET RECIPIENT ID INFORMATION
- REQUESTER ID INFORMATION
- VALIDITY INITIATION TIME
- VALIDITY EXPIRATION TIME
- USE (COLLECTION | ANALYSIS)

- CASE ID INFORMATION
- REQUEST DATA RANGE
- REQUEST DATA TYPE

- DATA COMPRESSION-RELATED INFORMATION (ALGORITHM USED)
- DATA ENCRYPTION-RELATED INFORMATION (ENCRYPTION,
  HASH VALUE,
  SIGNATURE ALGORITHM)
<FOR COLLECTION USE>
- EVIDENCE DATA ENCRYPTION KEY
<FOR ANALYSIS USE>
- EVIDENCE DATA DECRYPTION KEY
- ANALYSIS DATA ENCRYPTION KEY
( ※ ENCRYPTION/DECRYPTION KEY IS ENCRYPTED USING SHARED KEY
      OR TARGET RECIPIENT PUBLIC KEY)

- HASH INFORMATION (HASH ALGORITHM, HASH VALUE)
- ISSUER SIGNATURE INFORMATION (SIGNATURE ALGORITHM,
  SIGNATURE VALUE)
```

FIG. 5

PROVIDED EVIDENCE DATA

- TOKEN SERIAL NUMBER
- REQUESTER ID INFORMATION
- VALIDITY INITIATION TIME
- VALIDITY EXPIRATION TIME
- USE (ANALYSIS)

- CASE ID NUMBER
- EVIDENCE DATA ID INFORMATION (TICKET SERIAL NUMBER, TICKET HASH VALUE)
- EVIDENCE DATA PRODUCER ID INFORMATION (DEVICE INFORMATION)
- EVIDENCE DATA TIME INFORMATION
  (START AND END OF PRODUCTION)
- EVIDENCE DATA COMPRESSION-RELATED INFORMATION
  (ALGORITHM USED)
- EVIDENCE DATA ENCRYPTION-RELATED INFORMATION
  (ENCRYPTION, HASH, SIGNATURE ALGORITHM)
  EX., AES256_CBS_SHA256_RSA
- EVIDENCE DATA RANGE
- EVIDENCE DATA TYPE
- EVIDENCE DATA SIZE

- EVIDENCE DATA (COMPRESSION, ENCRYPTION)

- EVIDENCE DATA HASH INFORMATION
  (HASH ALGORITHM, HASH VALUE)
- EVIDENCE DATA PRODUCER SIGNATURE INFORMATION
  (SIGNATURE ALGORITHM, SIGNATURE VALUE)

- HASH INFORMATION (HASH ALGORITHM, HASH VALUE)
- PRODUCER SIGNATURE INFORMATION
  (SIGNATURE ALGORITHM, SIGNATURE VALUE)

FIG. 7

```
                    EVIDENCE ANALYSIS DATA

- TOKEN SERIAL NUMBER
- PROVIDER ID INFORMATION

- CASE ID NUMBER
- ANALYSIS DATA ID INFORMATION
  (TICKET SERIAL NUMBER, TICKET HASH VALUE)
- ANALYSIS DATA PRODUCER ID INFORMATION (ANALYST INFORMATION)
- ANALYSIS DATA TIME INFORMATION (START AND END OF ANALYSIS)
- ANALYSIS DATA COMPRESSION-RELATED INFORMATION
  (ALGORITHM USED)
- ANALYSIS DATA ENCRYPTION-RELATED INFORMATION
  (ENCRYPTION, HASH, SIGNATURE ALGORITHM)
  EX., AES256_CBS_SHA256_RSA
- ANALYSIS DATA RANGE
- ANALYSIS DATA TYPE
- ANALYSIS DATA SIZE

- ANALYSIS DATA (COMPRESSION, ENCRYPTION)

- HASH INFORMATION (HASH ALGORITHM, HASH VALUE)
- ANALYST SIGNATURE INFORMATION
  (SIGNATURE ALGORITHM, SIGNATURE VALUE)
```

FIG. 8

DEVICE AND METHOD FOR PROVIDING SECURITY IN REMOTE DIGITAL FORENSIC ENVIRONMENT

CROSS-REFERENCE TO RELATED APPLICATION

This application claims the benefit of Korean Patent Application No. 10-2013-0061425, filed May 30, 2013, which is hereby incorporated by reference herein in their entirety.

TECHNICAL FIELD

The present invention relates, in general, to an apparatus and method for providing security in a remote digital forensic environment and, more particularly, to an apparatus and method for collecting digital evidence from a target system to be analyzed at a remote location and then providing security in a remote digital forensic environment based on the collected digital evidence.

BACKGROUND ART

Digital forensics is a digital investigation process of collecting and analyzing digital data that is present in a digital device or system, such as a computer or a mobile phone, and then determining the behavior of a specific user or the cause of an accident.

In digital forensics, as can be seen from a term thereof, digital data is handled. It is easy to copy digital data by its nature, and it is difficult to distinguish a copy from an original. Accordingly, in order for digital data to have legal validity, the digital data needs to be processed and managed so that it can become evidence by securing the authenticity, integrity, reliability and originality of evidence data through proper control in data processing.

In conventional digital forensics, in order to collect evidence data from a target system to be analyzed, the original data within a non-volatile storage medium, such as a disk, is protected through a write-protection function by separating power from the target system. Furthermore, in conventional digital forensics, an evidence copy is generated, the generated evidence copy is transferred to an evidence analyst, and the evidence analyst analyzes the evidence copy.

An evidence collection cost is increased due to the recent increase in the capacity of a non-volatile storage medium, the availability of service becomes important as in a system that needs to continue to provide specific service, and the importance of volatile evidence data as well as the importance of non-volatile evidence data increases. Accordingly, the actions of removing power and collecting and analyzing evidence as in conventional digital forensics are restricted. Furthermore, the number of systems that may become the objects of digital forensics is gradually increasing. Moreover, there is an increasing need to deal with a specific accident by rapidly collecting and analyzing evidence.

For example, Korean Patent Application Publication No. 10-2009-0079568 entitled "Apparatus and Method for Collecting Evidence Data" discloses an apparatus and method for collecting evidence data, which are capable of ensuring admissibility of evidence for data for which it is difficult to ensure a storage medium.

Accordingly, there is an increasing need for an online-based remote digital forensics that can guarantee the availability of a target system that needs to be analyzed, can collect both volatile data and non-volatile evidence data, and can remotely collect or analyze evidence data without physically connecting directly to the target system for rapid handling.

Evidence data collected using digital forensic technology include all data present in systems, and may include information related to the privacy of a user and information sensitive to a system user, such as secret information related to the provision of system service. Furthermore, in the case of remote digital forensics, evidence data that is collected using digital forensic technology is provided based on online service. Accordingly, a problem arises in that the collected evidence data may be exposed to security threats, such as the leakage and alternation of data, a camouflage as a normal evidence collector, denial of transmission and reception of evidence data, and uses (or abuse) other than a use for evidence data, which are inherent in an existing IT environment.

Accordingly, there is a need for an apparatus and method capable of taking measures against security threats, satisfying basic digital forensic requirements for collected evidence data so that the processing of sensitive information can be controlled, and also providing security for evidence data by controlling access to the evidence data.

DISCLOSURE

Technical Problem

Accordingly, the present invention has been made keeping in mind the above problems occurring in the prior art, and an object of the present invention is to provide an apparatus and method for collecting digital evidence from a target system to be analyzed at a remote location and then providing security in a remote digital forensic environment based on the collected digital evidence.

Technical Solution

In order to accomplish the above object, the present invention provides a method of providing security, including making, by a security providing apparatus, an evidence collection request for collection of evidence of an evidence collection-target apparatus to an evidence collection agent in a remote digital forensic environment; collecting evidence data corresponding to the evidence collection request from the evidence collection agent; verifying the evidence data based on a signature value of the evidence data collected from the evidence collection agent; generating evidence analysis data based on the verified evidence data; verifying the evidence analysis data based on a signature value of the evidence analysis data; and providing security for the evidence collection-target apparatus based on results of the verification of the evidence analysis data.

The method may further include, before making the evidence collection request, performing mutual authentication with the evidence collection agent.

Generating the evidence analysis data may include generating the evidence analysis data using an evidence analysis method included in an evidence analysis token corresponding to the verified evidence data.

The evidence analysis token may include information about the evidence data, a predetermined evidence analysis method, an evidence analysis period, an evidence data decryption method, and a decryption key.

Verifying the evidence data may include verifying an evidence collection token received from the evidence collection agent along with the evidence data.

The evidence collection token may include information about the evidence collection-target apparatus, the predetermined type of evidence, a predetermined evidence collection method, collection permission information, and an evidence collection period.

In order to accomplish the above object, the present invention provides an apparatus for providing security, including an evidence collection unit configured to make an evidence collection request for collection of evidence of an evidence collection-target apparatus to an evidence collection agent in a remote digital forensic environment and then collect evidence data corresponding to the evidence collection request; an evidence management unit configured to verify the evidence data based on the signature value of the evidence data collected from the evidence collection agent; an evidence analysis unit configured to generate evidence analysis data based on the evidence data verified by the evidence management unit and then verify the evidence analysis data based on a signature value of the evidence analysis data; and an evidence control unit configured to provide security for the evidence collection-target apparatus based on the results of the verification of the evidence analysis data performed by the evidence analysis unit.

Mutual authentication may be performed between the evidence collection unit and the evidence collection agent before the evidence collection unit makes the evidence collection request from the evidence collection agent.

The evidence analysis unit may generate the evidence analysis data using an evidence analysis method included in an evidence analysis token corresponding to the verified evidence data.

The evidence analysis token may include information about the evidence data, the predetermined evidence analysis method, an evidence analysis period, an evidence data decryption method, and a decryption key.

The evidence analysis unit may verify an evidence collection token received along with the evidence data.

The evidence collection token may include information about the evidence collection-target apparatus, a predetermined type of evidence, a predetermined evidence collection method, collection permission information, and an evidence collection period.

Advantageous Effects

In accordance with the present invention, the apparatus and method for providing security in a remote digital forensic environment can take measures against security threats that may occur when digital evidence from a target device and a target system is collected and analyzed in a remote digital forensic environment, can protect collected evidence data so that the processing of sensitive information can be controlled, and can more effectively increase the security of evidence data and analysis data by controlling access to the evidence data.

DESCRIPTION OF DRAWINGS

FIG. 5 is a diagram illustrating the structure of an evidence collection token according to an embodiment of the present invention;

FIG. 7 is a diagram illustrating the structure of provided evidence data according to an embodiment of the present invention; and FIG. 8 is a diagram illustrating the structure of evidence analysis data according to an embodiment of the present invention.

MODE FOR INVENTION

Figure 1:
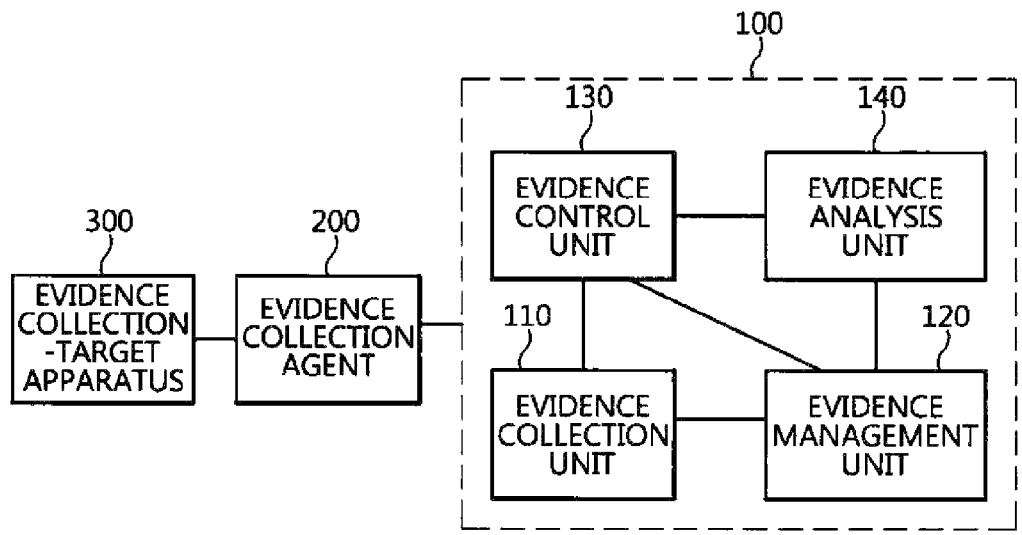
FIG. 1 is a diagram schematically illustrating the configuration of an apparatus for providing security in a remote digital forensic environment according to an embodiment of the present invention.

The present invention will be described in detail below with reference to the accompanying drawings. Repeated descriptions and descriptions of known functions and configurations which have been deemed to make the gist of the present invention unnecessarily vague will be omitted below. The embodiments of the present invention are intended to fully describe the present invention to a person having ordinary knowledge in the art. Accordingly, the shapes, sizes, etc. of elements in the drawings may be exaggerated to make the description clear.

An apparatus and method for collecting digital evidence from a target system to be analyzed at a remote location and providing security in a remote digital forensic environment based on the collected digital evidence according to embodiments of the present invention will be described in detail below with reference to the accompanying drawings.

FIG. 1 schematically shows the configuration of an apparatus 100 for providing security in a remote digital forensic environment according to an embodiment of the present invention.

Referring to FIG. 1, a remote digital forensic environment according to this embodiment of the present invention includes the apparatus 100 for providing security, an evidence collection agent 200, and an evidence collection-target apparatus 300.

The apparatus 100 for providing security includes an evidence collection unit 110, an evidence management unit 120, an evidence control unit 130, and an evidence analysis unit 140.

The evidence collection unit 110 receives an evidence collection request from the evidence control unit 130, and requests the evidence collection agent 200 to collect evidence in order to collect evidence from the evidence collection-target apparatus 300. In this case, the evidence collection unit 110 receives an evidence collection token (hereinafter also referred to as a "token") as well as the evidence collection request from the evidence control unit 130.

The evidence collection unit 110 receives evidence data corresponding to the evidence collection request, verifies the signature value of the received evidence data, affixes its signature to the evidence data if the received evidence data has been normally collected, and transfers the evidence data to the evidence management unit 120.

The evidence management unit 120 verifies the token corresponding to the evidence data which has been received from the evidence collection unit 110, and transfers the evidence data to the evidence analysis unit 140 based on the results of the verification. The evidence management unit 120 verifies the token corresponding to the evidence analysis data which has been received from the evidence analysis unit 140, and verifies and stores evidence analysis data.

The evidence control unit 130 determines a required type of evidence and an evidence collection method via the evidence collection-target apparatus 300, and transfers an evidence collection request to the evidence collection unit 110 based on the determined type of evidence and the determined evidence collection method. The evidence control unit 130 transfers a token together with the evidence collection request.

A token according to an embodiment of the present invention includes information about a target system which has been prepared by the evidence control unit 130, that is, information about the evidence collection-target apparatus 300, the type of evidence and an evidence collection method which have been previously determined (e.g., an evidence format, a compression method, an integrity method, an encryption method, and an encryption key), collection permission information, and an evidence collection period.

The evidence analysis unit 140 generates evidence analysis data based on the evidence data received from the evidence management unit 120, and transfers the generated evidence analysis data to the evidence management unit 120.

The evidence control unit 130 may provide security for the evidence collection-target apparatus 300 based on the results of verification of the evidence analysis data received from the evidence management unit 120.

The evidence collection agent 200 intermediates between the apparatus 100 for providing security and the evidence collection-target apparatus 300.

More particularly, the evidence collection agent 200 provides the apparatus 100 for providing security with evidence data that is present in the evidence collection-target apparatus 300 in response to an evidence collection request from the apparatus 100 for providing security.

Furthermore, the evidence collection agent 200 verifies a token corresponding to the evidence collection request of the apparatus 100 for providing security. The encryption key included in the token may be encrypted using a key value previously agreed so that only the evidence collection agent 200 can read the encryption key, or may be encrypted and processed using a public key of the evidence collection agent 200.

The evidence collection agent 200 checks whether or not the signature value of the token is a signature value corresponding to the evidence control unit 130, checks whether or not the collection permission information included in the token is identical with authentication permission information authenticated by the evidence collection unit 110, and checks whether or not the evidence collection period included in the token is valid. The evidence collection agent 200 generates the evidence data through format processing, compression processing, integrity processing, and encryption processing. The evidence collection agent 200 affixes its signature to the generated evidence data, and transfers the evidence data to the evidence collection unit 110.

The evidence collection-target apparatus 300 corresponds to an apparatus that is the object of accident investigation, and transfers evidence data required for the accident investigation to the apparatus 100 for providing security via the evidence collection agent 200. The apparatus 100 for providing security provides security to the evidence collection-target apparatus 300 using the evidence data.

A method of providing security in a remote digital forensic environment will be described in detail below with reference to FIG. 2.

Figure 2:
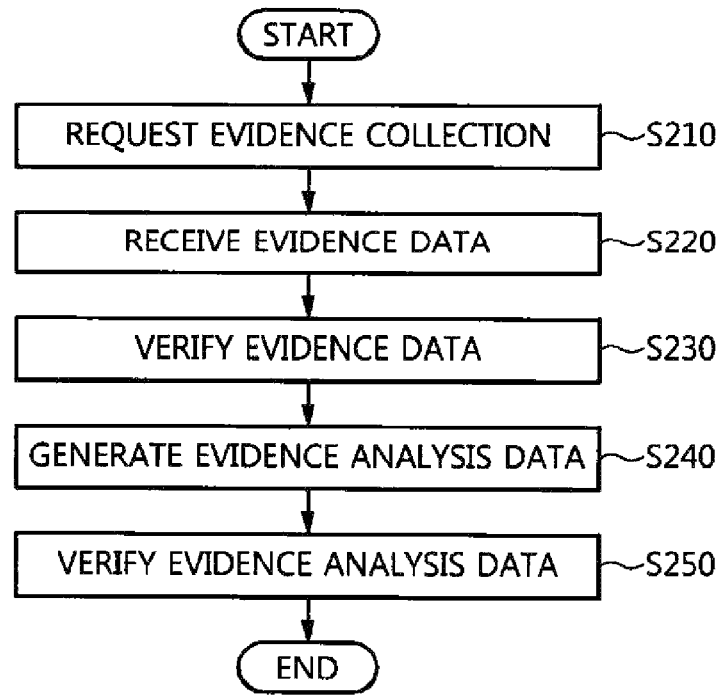
FIG. 2 is a flowchart illustrating a method of providing security in a remote digital forensic environment according to an embodiment of the present invention.

FIG. 2 is a flowchart illustrating a method of providing security in a remote digital forensic environment according to an embodiment of the present invention.

Referring to FIG. 2, in a remote digital forensic environment, the apparatus 100 for providing security sends an evidence collection request to the evidence collection agent 200 at step S210. The apparatus 100 for providing security transfers a token as well as the evidence collection request to the evidence collection agent 200.

The evidence collection agent 200 intermediates between the apparatus 100 for providing security and the evidence collection-target apparatus 300. That is, when the evidence collection request is received from the apparatus 100 for providing security, the evidence collection agent 200 receives evidence data corresponding to the evidence collection request from the evidence collection-target apparatus 300.

At step S220, the apparatus 100 for providing security receives evidence data corresponding to the evidence collection request at step S210.

The apparatus 100 for providing security verifies the evidence data, received at step S220, using the token corresponding to the evidence data at step S230.

The apparatus 100 for providing security generates evidence analysis data using the verified evidence data at step S240.

The apparatus 100 for providing security verifies the evidence analysis data, generated at step S240, using a token corresponding to the evidence analysis data at step S250.

As described above, the method of providing security in a remote digital forensic environment according to an embodiment of the present invention may be divided into a process of collecting evidence and a process of analyzing the collected evidence.

The process of collecting evidence in a remote digital forensic environment and the process of analyzing the collected evidence will be described in detail below with reference to FIGS. 3 and 4.

Figure 3:
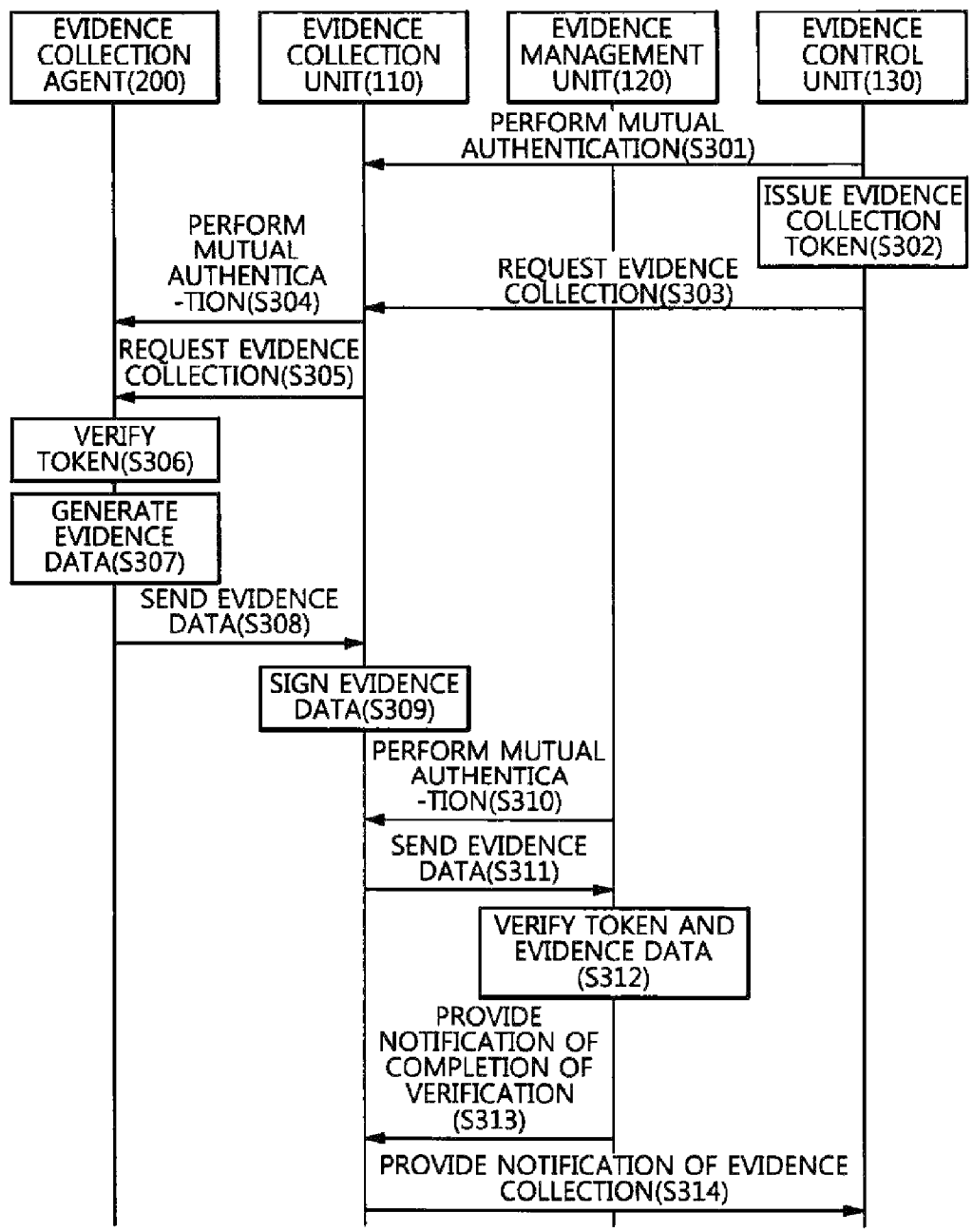
FIG. 3 is a diagram illustrating a process of collecting evidence in a remote digital forensic environment according to an embodiment of the present invention.

FIG. 3 is a diagram illustrating a process of collecting evidence in a remote digital forensic environment according to an embodiment of the present invention.

Referring to FIG. 3, in order to collect evidence from the evidence collection-target apparatus 300 in a remote digital forensic environment, the apparatus 100 for providing security and the evidence collection agent 200 are required. The apparatus 100 for providing security includes the evidence collection unit 110, the evidence management unit 120 and the evidence control unit 130, but the present invention is not limited thereto.

First, the evidence control unit 130 may guarantee a safe communication channel by performing mutual authentication with the evidence collection unit 110 in order to collect evidence at step S301.

The evidence control unit 130 issues a token, including information about a target system which has been prepared by the evidence control unit 130, that is, information about the evidence collection-target apparatus 300, the type of evidence and an evidence collection method (e.g., an evidence format, a compression method, an integrity method, an encryption method, and an encryption key) which have been previously determined, collection permission information, and an evidence collection period, at step S302. The encryption key included in the token may be encrypted using a key value previously agreed so that only the evidence collection agent 200 can read the encryption key, or may be encrypted and processed using the public key of the evidence collection agent 200.

The evidence control unit 130 determines a required type of evidence and an evidence collection method via the evidence collection-target apparatus 300 and transfers an evidence collection request to the evidence collection unit 110 based on the determined type of evidence and the determined evidence collection method at step S303. Here, the evidence control unit 130 transfers the evidence collection token, issued at step S302, to the evidence collection unit 110.

The evidence collection unit 110 may guarantee a safe communication channel by performing mutual authentication with the evidence collection agent 200 in order to collect evidence at step S304.

The evidence collection unit 110 transfers the evidence collection request, received at step S303, to the evidence collection agent 200 at step S305. The evidence collection unit 110 transfers the evidence collection token, issued at step S302, to the evidence collection agent 200 along with the evidence collection request.

The evidence collection agent 200 verifies the token corresponding to the evidence collection request at step S306. Here, the encryption key included in the token may be encrypted using a key value previously agreed so that only the evidence collection agent 200 can read the encryption key, or may be encrypted and processed using the public key of the evidence collection agent 200. Furthermore, the evidence collection agent 200 checks whether or not the signature value of the token is a signature value corresponding to the evidence control unit 130, checks whether or not the collection permission information included in the token is identical with authentication permission information authenticated by the evidence collection unit 110, and checks whether or not the evidence collection period included in the token is valid.

The evidence collection agent 200 generates evidence data through format processing, compression processing, integrity processing, and encryption processing at step S307. The evidence collection agent 200 affixes its signature to the generated evidence data and transfers the evidence data to the evidence collection unit 110 at step S308.

The evidence collection unit 110 receives the evidence data corresponding to the evidence collection request at step S305, verifies the signature value of the received evidence data, and affixes its signature to the evidence data if the received evidence data has been normally collected at step S309.

In order to manage the evidence data collected by the evidence collection unit 110, the evidence management unit 120 may guarantee a safe communication channel by performing mutual authentication with the evidence collection unit 110 at step S310.

Once mutual authentication has been performed as at step S310, the evidence collection unit 110 transfers the evidence data to which the signature has been affixed at step S309 to the evidence management unit 120 at step S311. The evidence collection unit 110 transfers the token, received from the evidence control unit 130 at step S303, to the evidence management unit 120 along with the evidence data.

The evidence management unit 120 verifies the received token by checking whether or not the signature value of the token corresponding to the evidence data received from the evidence collection unit 110 is the signature value of the token issued by the evidence control unit 130 and verifies the evidence data by checking whether or not collection permission information included in the token is identical with the authentication permission information authenticated by the evidence collection unit 110 at step S312. Furthermore, the evidence management unit 120 stores the verified evidence data and informs the evidence collection unit 110 that the verified evidence data has been stored at step S313.

In response thereto, the evidence collection unit 110 informs the evidence control unit 130 that evidence collection has been performed at step S314.

Figure 4:
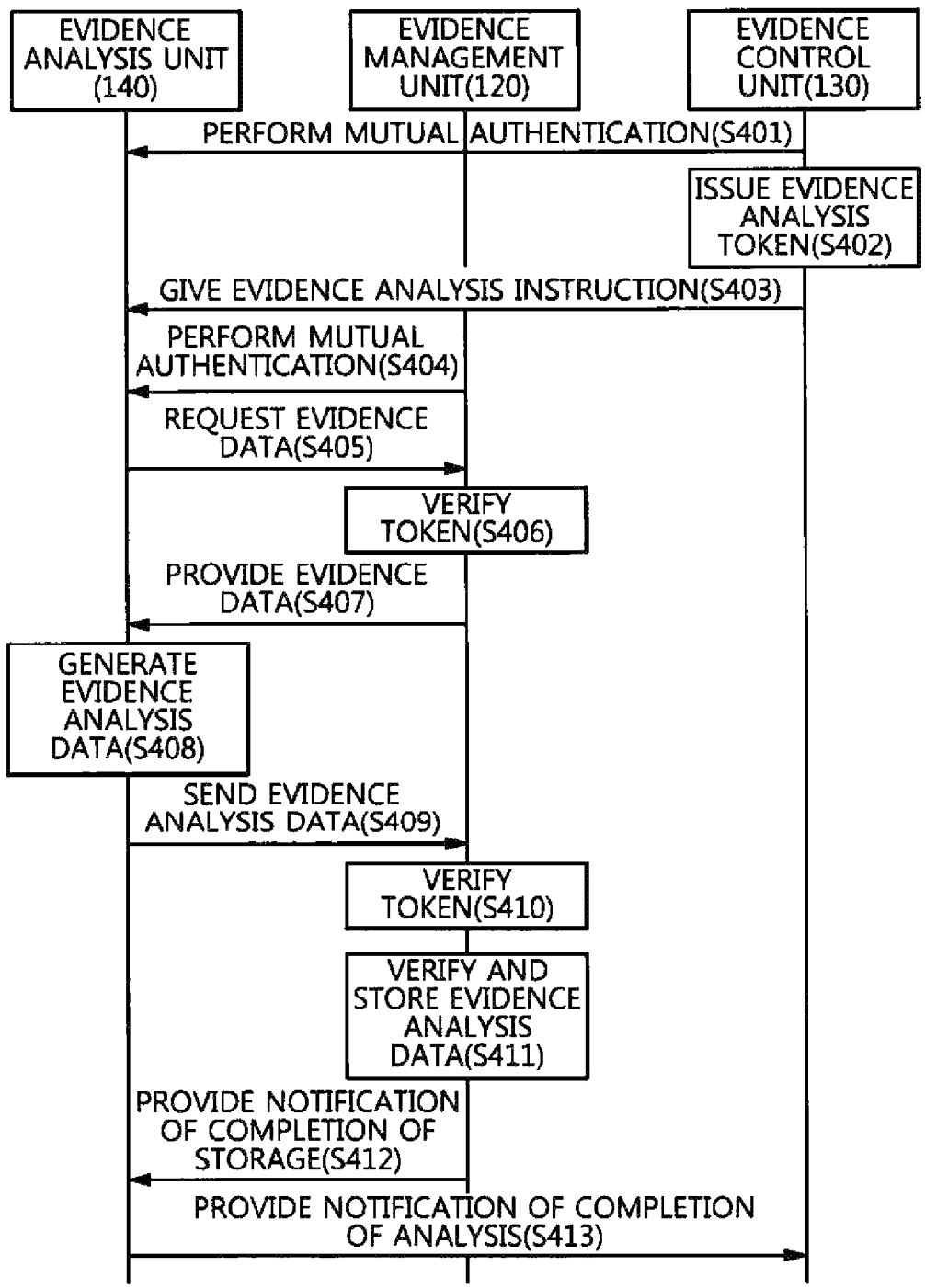
FIG. 4 is a diagram illustrating a process of analyzing collected evidence in a remote digital forensic environment according to an embodiment of the present invention.

FIG. 4 is a diagram illustrating a process of analyzing collected evidence in a remote digital forensic environment according to an embodiment of the present invention.

Referring to FIG. 4, in a remote digital forensic environment, in order to analyze evidence collected from the evidence collection-target apparatus 300, the evidence collection unit 110, the evidence management unit 120, and the evidence analysis unit 140 are required.

First, the evidence control unit 130 determines evidence data that belongs to the collected evidence data and needs to be analyzed and an evidence analysis method that corresponds to the determined evidence data, and designates the evidence analysis unit 140 that will analyze evidence.

The evidence control unit 130 may guarantee a safe communication channel by performing mutual authentication with the designated evidence analysis unit 140 in order to analyze evidence at step S401.

The evidence control unit 130 issues an evidence analysis token (hereinafter also referred to as a "token"), including evidence data information prepared by the evidence control unit 130, a determined evidence analysis method (e.g., an analysis data format, a compression method, an integrity method, an encryption method, and an encryption key), the analysis permission information of the evidence analysis unit 140, an evidence analysis period, an evidence data decryption method, and an evidence data decryption key at step S402. The encryption key and the decryption key included in the token may be encrypted using values previously agreed so that only the evidence analysis unit 140 can read the encryption key and the decryption key or may be encrypted and processed using the public keys of the evidence analysis unit 140.

The evidence control unit 130 gives an evidence analysis instruction to the evidence analysis unit 140 at step S403. Furthermore, the evidence control unit 130 transfers the token, issued at step S402, to the evidence analysis unit 140.

At step S404, the evidence analysis unit 140 may guarantee a safe communication channel by performing mutual authentication with the evidence management unit 120 in order to analyze evidence in response to the evidence analysis instruction received at step S403.

The evidence analysis unit 140 requests evidence data required to carry out the evidence analysis instruction received at step S403 from the evidence management unit 120 at step S405. The evidence analysis unit 140 transfers the evidence analysis token, received along with the evidence analysis instruction, to the evidence management unit 120.

The evidence management unit 120 verifies the evidence analysis token received along with the evidence data request at step S406. The evidence management unit 120 transfers evidence data to the evidence analysis unit 140 based on the results of verification of the token at step S407. The evidence analysis unit 140 transfers the token to the evidence analysis unit 140 along with the evidence data.

The evidence analysis unit 140 analyzes the received evidence data using the evidence data decryption method and decryption key included in the evidence analysis token and generates evidence analysis data using the evidence analysis method included in the evidence analysis token at step S408.

The evidence analysis unit 140 sends the generated evidence analysis data to the evidence management unit 120 at step S409. In this case, the evidence analysis unit 140 sends the evidence analysis token as well as the evidence analysis data to the evidence management unit 120.

The evidence management unit 120 verifies the evidence analysis token received along with the evidence analysis data by checking whether or not a signature value of the received evidence analysis token is a signature value corresponding to the evidence control unit 130 at step S410. Furthermore, the evidence management unit 120 verifies the evidence analysis data by checking whether or not analysis permission information included in the evidence analysis token is identical with the analysis permission information about the evidence analysis unit 140 and stores the verified evidence analysis data at step S411.

The evidence management unit 120 informs the evidence analysis unit 140 that the evidence analysis data has been stored at step S412. In response thereto, the evidence analysis unit 140 informs the evidence control unit 130 that evidence analysis has been completed at step S413.

The structure of a token will be described in detail below with reference to FIG. 5.

FIG. 5 is a diagram illustrating the structure of a token according to an embodiment of the present invention.

Referring to FIG. 5, the token may include a "serial number" unique to the token in order to distinguish an ID of the token from the ID of another token, "issuer ID information" about the subject that has issued the token (e.g., the evidence control unit 130), "target recipient ID information" corresponding to information about the ID of the subject (e.g., the evidence collection agent 200 or the evidence management unit 120) that receives and verifies the token, and "requester ID information" corresponding to information about the ID of the subject that receives and uses the token (e.g., the evidence collection unit 110 or the evidence analysis unit 140).

Issuer ID information is used when the evidence collection agent 200 or the evidence management unit 120 verifies whether or not the issuer ID information included in a received token has been generated by the previously authenticated evidence control unit 130.

Target recipient ID information is used when the evidence collection agent 200 or the evidence management unit 120 verifies whether or not the target recipient ID information included in the received token has been processed by the evidence collection agent 200 or the evidence management unit 120 by comparing the target recipient ID information with its own ID information.

Requester ID information is used when it is verified whether or not the token received from the evidence collection unit 110 or the evidence analysis unit 140 may be transferred by the evidence collection unit 110 or the evidence analysis unit 140 by comparing the requester ID information with information about the ID of the evidence collection unit 110 or the evidence analysis unit 140 included in the received token.

The token according to an embodiment of the present invention indicates information regarding who has issued a token, who will use the token, and who will receive the token through issuer ID information, target recipient ID information and requester ID information so that the use of the token is limited only to a user specified in the token.

Furthermore, the token according to an embodiment of the present invention specifies a period in which the token may be used, including a "validity initiation time" and a "validity expiration time" for the token, in order to determine the validity of the token itself. The evidence collection agent 200 or the evidence management unit 120 that receives the token and verifies the validity of the token determines whether or not to perform evidence processing by determining whether or not the token is within a valid period (i.e., from the validity initiation time to the validity expiration time).

Furthermore, the token is marked with "collection" or "analysis" in order to restrict the use of the token. In order to indicate grounds on which the token has been issued, the token includes "case ID information", that is, information about the ID of a case that is the object of evidence collection and analysis.

The token according to an embodiment of the present invention further includes "data compression-related information (e.g., an algorithm used)" and "data encryption-related information (e.g., encryption, a hash value, and a signature algorithm)" in order process evidence data generated by the evidence collection agent 200 or evidence analysis data generated by the evidence analysis unit 140.

The token according to an embodiment of the present invention may include only an "evidence data encryption key" for encrypting collected evidence data if the token is used for collection, and may include an "evidence data encryption key" for encrypting evidence analysis data and an "analysis data encryption key" for decrypting encrypted evidence data received from the evidence management unit 120 if the token is used for analysis.

A key used in encryption/decryption includes a key encrypted/decrypted using a secret key shared with a target recipient or a target recipient public key. Since collected evidence data and evidence analysis data may include sensitive information, such as private information about a user, the collected evidence data and the evidence analysis data are encrypted in order to prevent the sensitive information from being exposed to internal/external threat sources. The value of a key used in encryption is set to a value that can be known only to the subject (e.g., the evidence collection agent 200 and the evidence analysis unit 140) that generates collected evidence data and evidence analysis data and to the evidence control unit 130. Furthermore, when the key is transferred, the value is encrypted using a previously agreed value or the public key of the subject so that only the subject that generates the key knows the value, and is then transferred. The evidence control unit 130 knows the key of encrypted collected evidence data and encrypted evidence analysis data. Accordingly, the evidence control unit 130 may impose limitations by authenticating the corresponding subject who needs the collected evidence data and the evidence analysis data for analysis and reading uses and then providing the subject with a key capable of decrypting the collected evidence data and the evidence analysis data so that only the subject can decrypt the collected evidence data and the evidence analysis data.

The token according to an embodiment of the present invention may include "hash information (e.g., a hash algorithm or a hash value)" about the token in order to guarantee the integrity of the token itself and prevent denial of the token issued by the evidence control unit 130, and "issuer signature information (e.g., a signature algorithm or a signature value)," signed by the evidence control unit 130, in the hash value.

Evidence data generated by the evidence collection agent 200, that is, evidence data collected by the evidence collection unit 110 (hereinafter also referred to as "collected evidence data"), will be described in detail below with reference to FIG. 6.

Figure 6:
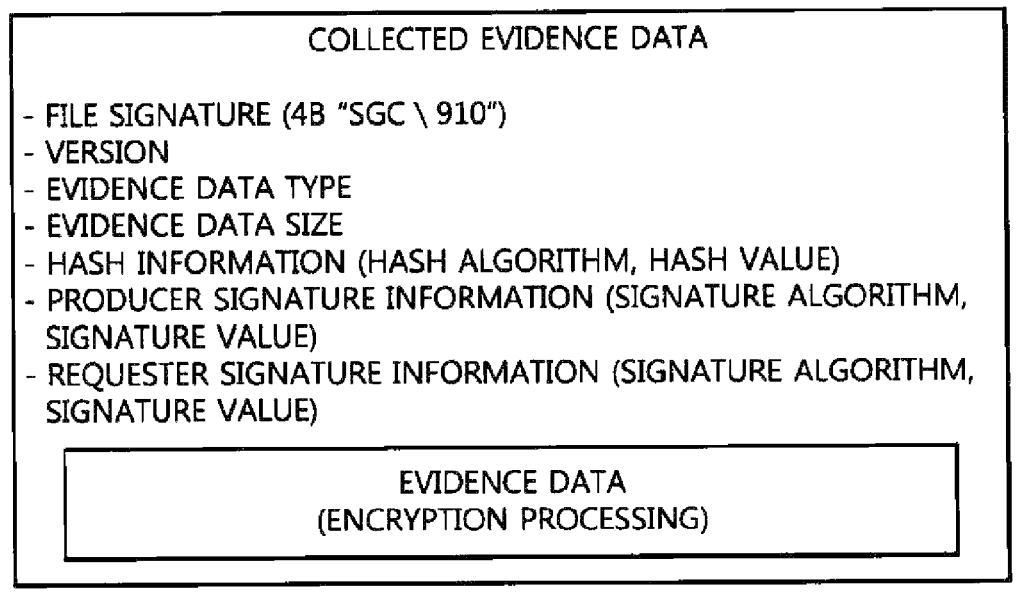
FIG. 6 is a diagram illustrating the structure of collected evidence data according to, an embodiment of the present invention.

FIG. 6 is a diagram illustrating the structure of collected evidence data according to an embodiment of the present invention.

Referring to FIG. 6, the collected evidence data includes a file signature, the version of an evidence data structure, the type of collected evidence data, and information about the size of the evidence data. The collected evidence data further includes hash information, for example, a hash algorithm or a hash value, in order to guarantee the integrity of the evidence data and prevent denial of the generation of the evidence data. The collected evidence data further includes information (e.g., a signature algorithm or a signature value) about the signatures of a producer and a requester in order to prevent denial of the reception of the collected evidence data before the evidence collection unit 110 transfers the evidence management unit 120.

Evidence data that is provided by the evidence management unit 120 (hereinafter also referred to as "provided evidence data") will be described in detail below with reference to FIG. 7.

FIG. 7 is a diagram illustrating the structure of provided evidence data according to an embodiment of the present invention.

Referring to FIG. 7, the provided evidence data includes token information, case ID information related to the generation of evidence data, and evidence data ID information that are used by the evidence analysis unit 140 when an evidence data request is made, and includes the evidence data itself to be provided. The collected evidence data further includes the hash information of the provided evidence data and information about the signature of an evidence data producer in order to guarantee the integrity of the provided evidence data and prevent denial of the provided evidence data.

Evidence analysis data that is generated by the evidence analysis unit 140 will be described in detail below with reference to FIG. 8.

FIG. 8 is a diagram illustrating the structure of evidence analysis data according to an embodiment of the present invention.

Referring to FIG. 8, the evidence analysis data includes token information (e.g., a token serial number) that is used in analysis, information about the ID of a provider who has provided the evidence analysis data, a case ID number that is related to the generation of the evidence analysis data, an evidence analysis data ID number, and so on. The evidence analysis data further includes the evidence analysis data itself to be provided, and further include the hash information of the evidence analysis data and information about the signature of an analyst in order to guarantee the integrity of the evidence analysis data and prevent denial of the evidence analysis data.

As described above, the apparatus and method for providing security in a remote digital forensic environment can take measures against security threats that may occur when digital evidence from a target device and a target system is collected and analyzed in a remote digital forensic environment, can protect collected evidence data so that the processing of sensitive information can be controlled, and can more effectively increase the security of evidence data and analysis data by controlling access to the evidence data.

The exemplary embodiments have been disclosed in the drawings and specification. Specific terms have been used herein, but the terms are used only to describe the present invention, but are not used to limit the meaning of the terms or the scope of the present invention described in the claims. Accordingly, it will be apparent to those skilled in the art that various modifications and other equivalent embodiments are possible from the present invention. Accordingly, the true technical scope of the present invention should be determined based on the following claims.

The invention claimed is:

1. A method of providing security, comprising:
    making, by a security providing apparatus, an evidence collection request for collection of evidence of an evidence collection-target apparatus to an evidence collection agent in a remote digital forensic environment;
    collecting evidence data corresponding to the evidence collection request from the evidence collection agent;
    verifying the evidence data based on a signature value of the evidence data collected from the evidence collection agent;
    generating evidence analysis data based on the verified evidence data;
    verifying the evidence analysis data based on a signature value of the evidence analysis data; and
    providing security for the evidence collection-target apparatus based on results of the verification of the evidence analysis data,
    wherein verifying the evidence data comprises verifying an evidence collection token received from the evidence collection agent along with the evidence data,
    wherein the evidence collection token comprises information about the evidence collection-target apparatus, a predetermined type of evidence, a predetermined evidence collection method, collection permission information, and an evidence collection period,
    wherein generating the evidence analysis data comprises generating the evidence analysis data using an evidence analysis method included in an evidence analysis token corresponding to the verified evidence data, and
    wherein the evidence analysis token comprises information about the evidence data, a predetermined evidence analysis method, an evidence analysis period, an evidence data decryption method, and a decryption key.

2. The method of claim 1, further comprising, before making the evidence collection request, performing mutual authentication with the evidence collection agent.

3. An apparatus for providing security, comprising:
    an evidence collection unit stored in a memory configured to make an evidence collection request for collection of evidence of an evidence collection-target apparatus to an evidence collection agent in a remote digital forensic environment and then collect evidence data corresponding to the evidence collection request;
    an evidence management unit stored in a memory configured to verify the evidence data based on a signature value of the evidence data collected from the evidence collection agent;
    an evidence analysis unit stored in a memory configured to generate evidence analysis data based on the evidence data verified by the evidence management unit and then verify the evidence analysis data based on a signature value of the evidence analysis data; and an evidence control unit stored in the memory configured to provide security for the evidence collection-target apparatus based on results of the verification of the evidence analysis data performed by the evidence analysis unit, wherein the evidence analysis unit verifies an evidence collection token received along with the evidence data, wherein the evidence collection token comprises information about the evidence collection-target apparatus, a predetermined type of evidence, a predetermined evidence collection method, collection permission information, and an evidence collection period, wherein the evidence analysis unit generates the evidence analysis data using an evidence analysis method included in an evidence analysis token corresponding to the verified evidence data, and wherein the evidence analysis token comprises information about the evidence data, the predetermined evidence analysis method, an evidence analysis period, an evidence data decryption method, and a decryption key.

4. The apparatus of claim 3, wherein mutual authentication is performed between the evidence collection unit and the evidence collection agent before the evidence collection unit makes the evidence collection request from the evidence collection agent.

* * * * *